(12) United States Patent
Song et al.

(10) Patent No.: US 11,906,088 B2
(45) Date of Patent: Feb. 20, 2024

(54) HOSE AND RIGID PIPE CONNECTING SYSTEM USED IN HIGH PRESSURE SYSTEM

(71) Applicant: SHANGHAI ZHONGYUAN FUEL RAIL MANUFACTURE CO., LTD, Shanghai (CN)

(72) Inventors: Xiaowei Song, Shanghai (CN); Xiaoyong Peng, Shanghai (CN); Shijie Yan, Shanghai (CN)

(73) Assignee: SHANGHAI ZHONGYUAN FUEL RAIL MANUFACTURE CO., LTD, Shanghai (CN)

( * ) Notice: Subject to any disclaimer, the term of this patent is extended or adjusted under 35 U.S.C. 154(b) by 292 days.

(21) Appl. No.: 17/413,958

(22) PCT Filed: Dec. 13, 2019

(86) PCT No.: PCT/CN2019/124962
§ 371 (c)(1),
(2) Date: Jun. 15, 2021

(87) PCT Pub. No.: WO2021/114195
PCT Pub. Date: Jun. 17, 2021

(65) Prior Publication Data
US 2022/0316635 A1    Oct. 6, 2022

(30) Foreign Application Priority Data
Dec. 11, 2019   (CN) .......................... 201911268166.0

(51) Int. Cl.
*F16L 33/207*   (2006.01)
*F16L 25/00*    (2006.01)
(Continued)

(52) U.S. Cl.
CPC .......... *F16L 27/111* (2013.01); *F16L 25/0036* (2013.01); *F16L 33/2076* (2013.01); *B60H 1/00571* (2013.01)

(58) Field of Classification Search
CPC ... F16L 25/0036; F16L 33/26; F16L 33/3301; F16L 33/2076; F16L 47/24; F16L 11/15; F16L 11/11; B60H 1/00571
(Continued)

(56) References Cited

U.S. PATENT DOCUMENTS 5,413,147 A * 5/1995 Moreiras ............. F16L 25/0036
5,794,986 A * 8/1998 Gansel ................ F16L 25/0036
(Continued)

FOREIGN PATENT DOCUMENTS

CN    1719088    1/2006
CN    2842130    11/2006
(Continued)

OTHER PUBLICATIONS

EP-2995837-B1—Machine Translation—English (Year: 2019).*
"International Search Report (Form PCT/ISA/210) of PCT/CN2019/124962," dated Sep. 16, 2020, pp. 1-5.

*Primary Examiner* — William S. Choi
(74) *Attorney, Agent, or Firm* — JCIP GLOBAL INC.

(57) ABSTRACT

A hose and rigid pipe connecting system used in a high pressure system comprises: a hose made up of connecting a core pipe and a corrugated pipe, the outer side of the corrugated pipe being wound and woven by metal wires; a rigid pipe; a transition joint connecting the hose and the rigid pipe; and a retaining ring buckled on the outer side of the hose and the transition joint. The invention has the advantages that the sealing performance between the hose and the rigid pipe can be greatly improved, and the problem that the connecting part of the hose and the rigid pipe can not bear pressure Or resist high and low temperatures is solved;

(Continued)

besides, the axial tensile strength and sealing reliability are improved by winding and weaving metal wires on the outer side of the metal corrugated pipe and then welding with the core pipe.

11 Claims, 20 Drawing Sheets

(51) Int. Cl.
 B60H 1/00 (2006.01)
 F16L 27/111 (2006.01)
(58) Field of Classification Search
 USPC ............. 285/903, 222.1, 222.2, 222.3, 222.4
 See application file for complete search history.

(56) References Cited

U.S. PATENT DOCUMENTS

| | | | |
|---|---|---|---|
| 9,255,657 B2* | 2/2016 | Yoshino | |
| 2003/0080554 A1* | 5/2003 | Schroeder | |
| 2004/0118470 A1* | 6/2004 | Furuta | F16L 33/26 |

FOREIGN PATENT DOCUMENTS

| | | | |
|---|---|---|---|
| CN | 102478139 | 12/2014 | |
| CN | 204099761 | 1/2015 | |
| CN | 105987240 | 10/2016 | |
| CN | 209743846 | 12/2019 | |
| DE | 202005005210 | 6/2005 | |
| EP | 2113707 A2 * | 11/2009 | .......... F16L 33/2076 |
| EP | 2995837 B1 * | 11/2019 | .............. F16L 11/15 |
| GB | 2506222 | 3/2014 | |
| WO | 2019145749 | 8/2019 | |
| WO | WO-2019145749 A1 * | 8/2019 | .............. F16L 11/15 |

* cited by examiner

HOSE AND RIGID PIPE CONNECTING SYSTEM USED IN HIGH PRESSURE SYSTEM

CROSS-REFERENCE TO RELATED APPLICATION

This application is a 371 of international application of PCT application serial no. PCT/CN2019/124962, filed on Dec. 13, 2019, which claims the priority benefit of China application no. 201911268166.0, filed on Dec. 11, 2019. The entirety of each of the above mentioned patent applications is hereby incorporated by reference herein and made a part of this specification.

FIELD OF TECHNOLOGY

The invention relates to a connecting system, in particular to a hose and rigid pipe connecting system used in a high pressure system.

BACKGROUND

With the increasing demand of consumers for comfort experience and the ever-growing emphasis on environmental protection in China, new energy electric transportation has become a trend. With the improvement of the requirements for the cruising range of new energy electric vehicles, thermal management plays a key role in the popularization of urban electric transportation, the extension of battery life, the improvement of endurance and the improvement of performance of a drive system.

At present, heat pump air conditioning is an effective solution for pure electric vehicle air conditioning and battery thermal management. Heat pump air conditioning is one of the few feasible technologies to ensure low energy consumption without breakthrough of power battery, and its efficiency coefficient is much higher than PTC heating, so that the cruising range can be effectively extended.

A traditional air conditioning refrigerant is R134a, and pressure of an air conditioning system can be divided into high pressure and low pressure according to working conditions, wherein the high pressure is about 13 bar and the low pressure is 1-3 bar. Therefore, R134a is only a substitute in the transition to environmentally friendly products, and it is only a matter of time before it is completely eliminated. R744(CO2) carbon dioxide refrigerant is used as the refrigerant for heat pump air conditioning, and the working pressure of a high-pressure pipe is 170 bar, and the maximum pressure in the pipe can reach 300 bar under extreme high temperature climate conditions. The working pressure of medium and low pressure pipes is 60-130 bar. Similarly, the pressure in the pipes will increase greatly in extreme high temperature climate. At the same time, the lowest working temperature is −40° C. and the highest working temperature is 165° C. Therefore, the traditional automobile air conditioning hose assembly cannot meet the requirement of withstanding the ambient temperature of −40° C. to 165° C. and the system pressure of 170 bar (limit pressure of 300 bar). When used in new energy vehicles, only PTC can be used for air conditioning heating, which will greatly reduce the cruising range of automobiles; if all the pipes are connected by rigid pipes, the sealing problem of the pipes can be solved, but, due to the limitation of an inner space of an automobile, it is impossible to adopt rigid pipes completely, and a pipe assembly combining hoses and rigid pipes have to be used. Therefore, a technical problem that needs to be solved urgently now is, by strictly ensure the sealing performance of connecting pieces to adapt to high and low temperatures and high pressure atmosphere, to provide an air conditioning pipeline that can use a carbon dioxide refrigerant and adapt to high and low temperature alternation and high pressure conditions.

Chinese patent CN102478139B discloses a duct joint, including a soft pipe, a hard pipe and a sleeve. The hard pipe includes an insertion part which is inserted into the soft pipe from the end of the soft pipe. The sleeve is arranged radially outside the insertion part and the soft pipe, and presses the soft pipe toward the insertion part. The insertion part includes a corrugated surface provided on the outer surface of the insertion part and a cylindrical surface provided on the outer surface at the top end side of the insertion part. The sleeve includes a first small-diameter part and a second small-diameter part, wherein the first small-diameter part is arranged radially outside the corrugated surface and presses the soft pipe toward the corrugated surface, and the second small-diameter part is provided radially outside the cylindrical surface and presses the soft pipe toward the cylindrical surface. Although this patent can also realize the connection between a hose and a rigid pipe, this kind of duct joint cannot be used under high pressure, and cannot be applied to new energy electric vehicles.

Chinese patent CN1719088A discloses a pressure-resistant and vibration-absorbing hose, which can make a joint fitting reliably swaged at its axial end, wherein the axial end of the hose does not break during the swaging process of the joint fitting, and the joint fitting can be installed effortlessly. A compression-resistant and vibration-absorbing hose has a hose body and a joint fitting, wherein the hose body includes an inner surface rubber layer, a reinforcing layer and an outer surface rubber layer, and the joint fitting has a rigid insertion pipe and a socket fitting. By swaging the socket fitting on the hose body, the joint fitting can be connected to a swaged portion of the axial end of the hose body. However, this patent only involves the hose, and cannot solve the sealing problem at the joint between the hose and rigid pipe, thus it cannot be used in high pressure systems.

SUMMARY

An object of the present invention is to provide a hose and rigid pipe connecting system used in a high pressure system in order to overcome the defects in the prior art, and solve the technical problems of insufficient pressure bearing during hose and rigid pipe connection, poor sealing performance under high and low temperature conditions and poor axial tensile strength in the prior art.

The object of the present invention can be achieved by the following technical solution.

A hose and rigid pipe connecting system used in a high pressure system, including:

a hose made up by connecting a core pipe and a corrugated pipe, an outer side of the corrugated pipe being wound and woven by metal wires, wherein by directly winding and weaving the metal wires around the corrugated pipe and then welding with the core pipe, the axial tensile strength and sealing reliability is improved;

a rigid pipe;

a transition joint connecting the hose and the rigid pipe;

a retaining ring buckled on the outer sides of the hose and the transition joint.

The metal wires at the two ends of the corrugated pipe are sleeved with sheaths, and are tightened and positioned by the sheaths.

The corrugated pipe, the metal wires and the sheaths are integrally connected with the core pipe by welding, riveting or rolling interference.

In a first solution, a rubber pipe is cut into a specified length, and the connected core pipe and corrugated pipe are inserted into the rubber pipe to form a hose. This solution has simple and convenient production process and low manufacturing cost.

An annular protrusion is provided on an outer surface of the core pipe, and convex teeth are provided at the outer ends of the core pipe and extend out of the rubber pipe.

In a second solution, the outer sides of the core pipe, the corrugated pipe, the metal wires and the sheaths are subjected to integral rubber coating, that is, being coated with an inner rubber layer, a middle reinforcing layer and an outer rubber layer. This method makes inner rubber fill valleys of the corrugated pipe, the metal wires at the outer surfaces, the core pipe and the outer side surfaces of the sheaths, thereby reducing the deformation of the corrugated pipe, avoiding the generation of deformation martensite and enhancing the pressure resistance of the hose.

The coated middle reinforcing layer is metal wire, aramid wire or aramid cloth. When coating, the middle reinforcing layer is obtained by weaving the metal wires or aramid wire around the inner rubber layer, and the middle reinforcing layer is obtained by wrapping and bonding the aramid cloth around the inner rubber layer.

Convex teeth are provided at the outer ends of the core pipe, an annular protrusion is provided on the outer surface of the core pipe, and the annular protrusion is embedded into the inner surface of a rubber coating layer during rubber coating, thus ensuring that no positions of the corrugated pipe, the core pipe, the metal wires, the sheaths, etc. are changed after rubber coating.

After the rubber coating is completed, the coated rubber at both ends is stripped to expose the convex teeth at the outer ends of the core pipe.

The outer diameter of the core pipe is not larger than the outer diameters of the sheaths.

The welding includes laser welding, argon arc welding, gas shielded brazing, high frequency induction welding or plasma welding.

The hoses are connected by a traction pipe, and the traction pipe is inserted into the rubber pipe and the rubber coating is performed on the outer side. Through the above treatment, the corrugated pipes can be connected with each other to meet the length requirements of rubber coating production.

The traction pipe extends into or is sleeved into an opening of the core pipe for interference fit connection or threaded connection.

The core pipe is connected with the transition joint through the convex teeth at the outer ends.

The material of the rigid pipe is aluminum, stainless steel or other metals.

The rigid pipe is connected with the transition joint by flame brazing, high frequency induction welding, cold welding, gas shielded brazing or laser welding.

The rigid pipe is connected with a platen by flame brazing, high frequency induction welding, cold welding, gas shielded brazing and laser welding on the side opposite to the side connected with the transition joint.

The transition joint in cooperation with the second solution is provided with an inwardly concaved annular groove and an annular recess.

In addition to the inwardly concaved annular groove and the annular recess, the transition joint in cooperation with the first solution is provided with a protruding part at the connecting end between the transition joint and the hose, the protruding part extends between the core pipe and the rubber pipe to fill a gap between the rubber pipe and the core pipe, and subsequently the sealing connection among the protruding part, the rubber pipe and the core pipe is completed by further processing.

The material of the retaining ring is aluminum, stainless steel or other metals, one end of the retaining ring is inwardly convexed, and the inwardly convexed end is embedded into the inwardly concaved annular groove of the transition joint when being buckled.

When the retaining ring is made of aluminum, the inner surface is of a flat structure. Due to the relatively soft aluminum material, the retaining ring can be pressed into the annular recess of the transition joint during buckling processing, so that tight connection can be realized without additional process steps, and the processing difficulty and cost are reduced.

The retaining ring is made of stainless steel or other metals, an annular inwardly convexed structure is provided at the inner surface, the annular inwardly convexed structure is matched with the annular protrusion of the core pipe, rubber can be tightly pressed by pressing the annular inwardly convexed structure of the retaining ring into grooves of the adjacent annular protrusion corresponding to the core pipe. Since the stainless steel or other metal materials are relatively hard, this solution has higher tensile strength.

A buckling claw of a buckling machine compresses the retaining ring to squeeze the transition joint, so as to realize riveting connection between the transition joint and the core pipe and the retaining ring, and to achieve sealing and pull-off resistance effects.

The buckling claw of the buckling machine integrally squeezes or locally squeezes in a targeted manner along an outer wall of the retaining ring.

Compared with the prior art, the technical solutions disclosed by the invention has the following advantages:

1. Due to poor tensile property of rubber at high temperature, in this application, by winding and weaving the metal wires around the metal corrugated pipe and then welding with the core pipe, the axial tensile strength and sealing reliability are improved; and under high and low temperature conditions, the rubber is seriously aged and the mechanical properties of rubber gradually decrease until it fails, on the contrary, the metal wires have low temperature sensitivity and are not affected by high and low temperatures, so that the mechanical properties of the metal wires are stable and the tensile properties are high;

2. The metal corrugated pipe, the metal wires, the sheaths and a core pipe component are mutually pulled and subjected to rubber coating continuously, so that large-scale continuous production can be realized;

3. The metal corrugated pipe, the metal wires, the sheaths and the core pipe component are subjected to integral rubber coating, and inner rubber fills valleys of the corrugated pipe, the metal wires on the outer surface, the outer side surface of the core pipe, thereby reducing the deformation of the corrugated pipe, avoiding deformation martensite and enhancing the pressure resistance of a hose assembly;

4. The transition joint is in riveting and sealing connection with the retaining ring and the core pipe under integral buckling by the retaining ring, so that the conversion of the rigid pipe of different metals and the sealing of a buckled part are realized without being affected by temperature;

5. With the adoption of the above comprehensive technical solution, the performance of the hose assembly is greatly improved, and the application can withstand the test of high pressure working conditions and the pressure-bearing sealing capacity of the hose assembly does not decrease in high and low temperature environments;

6. The overall environment of the pipeline in this design is completely similar to that of a high-pressure vessel, and each link bears pressure uniformly, so that a working medium does not come into contact with rubber parts, and no leakage caused by material yielding is generated.

Figure 1:
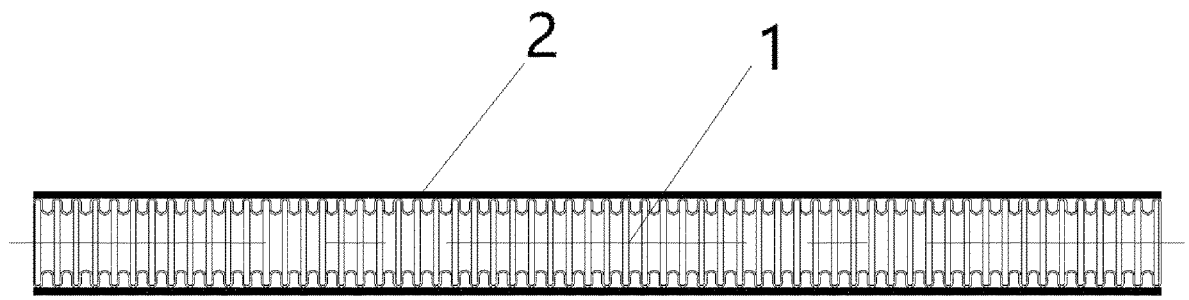
FIG. 1 is a schematic structure diagram of a corrugated pipe wound by metal wires in embodiment 1.

In the drawings, 1—corrugated pipe, 2—metal wire, 3—sheath, 4—core pipe, 41—convex tooth, 42—annular protrusion, 5—rigid pipe, 6—platen, 7—transition joint, 71—annular groove, 72—annular recess, 73—protruding part, 8—retaining ring, 81—inwardly convexed part, 82—annular inwardly convexed structure, 9—traction pipe, 10—rubber coating layer, 11—rubber pipe.

DESCRIPTION OF THE EMBODIMENTS

The invention will be described in detail with specific embodiments below. The following embodiments will help those skilled in the art to further understand the present invention, but do not limit the present invention in any way. It should be noted that variations and modifications can be made by persons skilled in the art without departing from the concept of the invention. These all belong to the protection scope of the present invention.

Embodiment 1

A hose and rigid pipe connecting system used in a high pressure system, which mainly comprises a hose, a rigid pipe 5, a transition joint 7, a retaining ring 8, etc. The used hose is made up of connecting a core pipe 4 and a corrugated pipe 1, and other components. The structure of the used corrugated pipe 1 is shown in FIG. 1. In this embodiment, a metal corrugated pipe is used, and the outer side of the corrugated pipe 1 is wound and woven by metal wires 2, the wound metal wires coat the outer surface of the corrugated pipe 1 to form a reinforcing layer. In this way, by directly winding and weaving the metal wires around the outer side of the corrugated pipe and then connecting with the core pipe 4, the axial tensile strength and sealing reliability can be improved.

Figure 2:
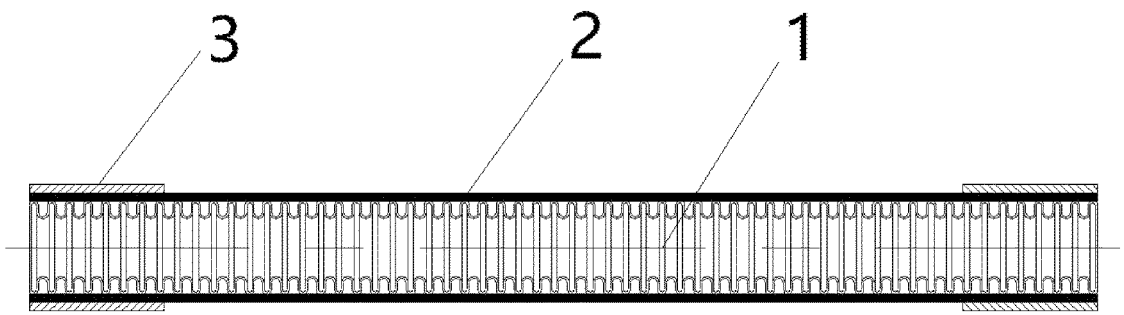
FIG. 2 is a schematic structure diagram of the corrugated pipe equipped with sheaths in embodiment 1.
Figure 3:
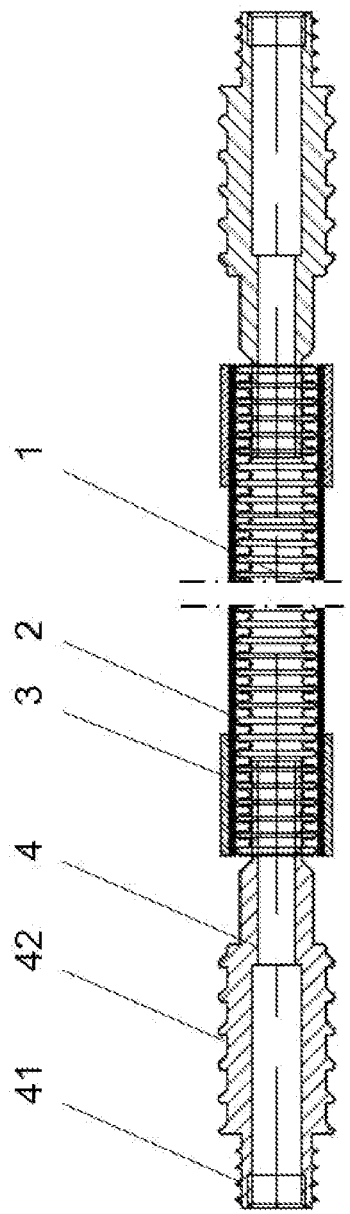
FIG. 3 is a schematic structure diagram after welding a core pipe in embodiment 1.

The outer sides of the metal wires 2 at both ends of the corrugated pipe 1 are sleeved with sheaths 3, as shown in FIG. 2, and the metal wires 2 are further tightened and positioned by the sheaths 3, so that a fastened connection is formed between the metal wires 2 and the corrugated pipe 1. Then, the core pipes 4 are connected with both ends of the corrugated pipe 1, as shown in FIG. 3. The connecting mode can be welding, riveting or rolling interference, and the welding can also be laser welding, argon arc welding, gas shielded brazing, high frequency induction welding or plasma welding. In order to ensure the sealing connection among the corrugated pipe 1, the metal wires 2, the sheaths 3 and the core pipe 4, the connecting mode of high frequency induction welding is adopted in this embodiment. An annular protrusion 42 is provided on the outer surface of the adopted core pipe 4, threads 41 are provided at the outer ends, and the outer diameter of the core pipe 4 is smaller than those of the sheaths 3 connected with the outer sides of the metal wires 2. In the subsequent rubber coating, the annular protrusion 42 is embedded into the inner surface of the rubber coating layer 10 to ensure that no positions of the corrugated pipe 1, the metal wires 2, the sheaths 3, the core pipe 4, etc. are changed after rubber coating.

Figure 4:
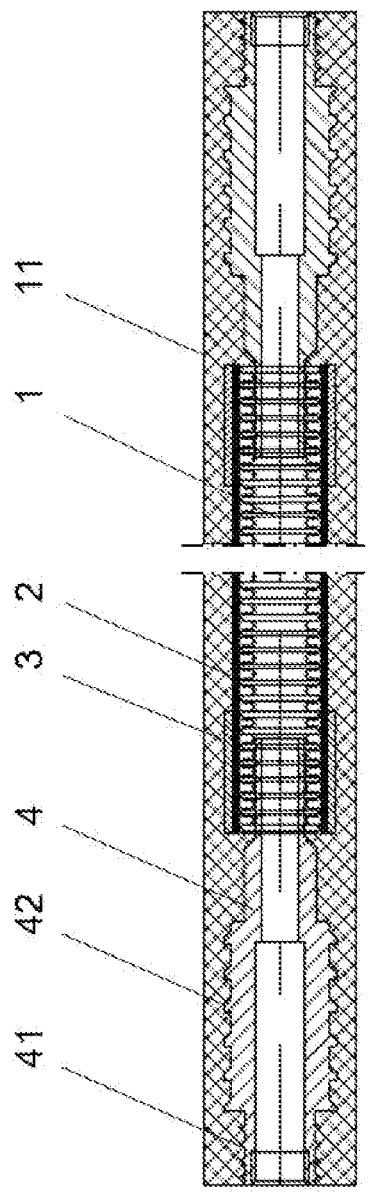
FIG. 4 is a schematic structure diagram after rubber coating in embodiment 1.
Figure 5:
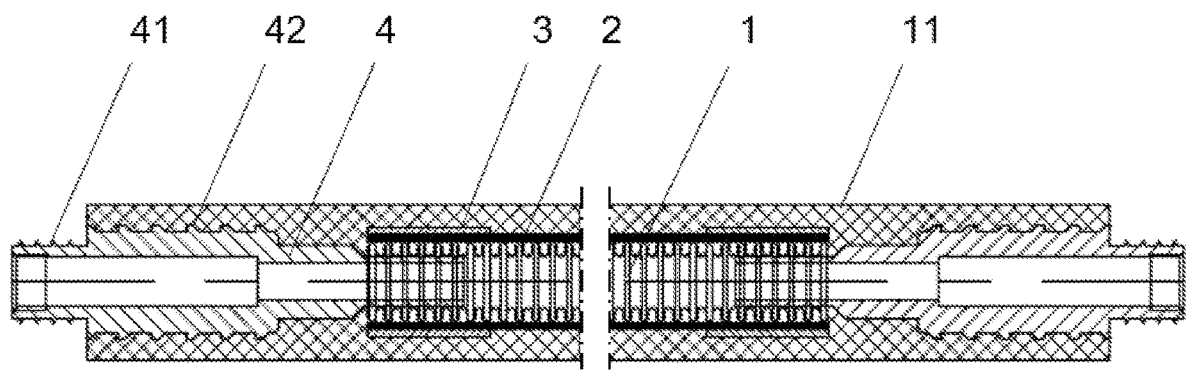
FIG. 5 is a schematic structure diagram after rubber stripping in embodiment 1.

In the embodiment, the adopted rubber coating mode is integral rubber coating, as shown in FIG. 4. The outer sides of the metal wires 2 on the outer surface of the core pipe 4 and the corrugated pipe 1 are subjected to integral rubber coating, that is, being coated with rubber to form a rubber coating layer 10, and the rubber coating layer 10 can coat an inner rubber layer, a middle reinforcing layer and an outer rubber layer. This method makes inner rubber fill valleys of the corrugated pipe 1, the metal wires 2 at the outer surface and the outer surfaces of the sheaths 3, thereby reducing the deformation of the corrugated pipe 1 and avoiding the generation of deformation martensite, and improving the pressure resistance of the hose. The coated middle reinforcing layer is metal wire, aramid wire or aramid cloth. When coating, the middle reinforcing layer is obtained by weaving the metal wires or aramid wire around the inner rubber layer, and the middle reinforcing layer is obtained by wrapping and bonding the aramid cloth around the inner rubber layer. In this embodiment, metal wires are adopted. After the above-mentioned rubber coating is completed, the coated rubber at both ends is stripped to expose the convex teeth 41 at the outer ends of the core pipe 4, and thus the hose is manufactured, as shown in FIG. 5.

Figure 6:
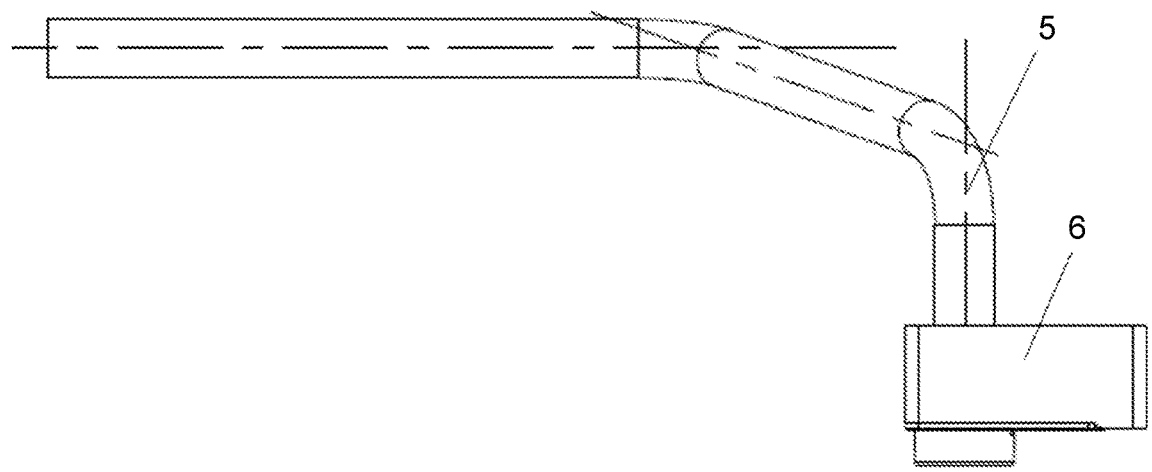
FIG. 6 is a schematic diagram of a connecting structure of a rigid pipe and a platen in embodiment 1.
Figure 7:
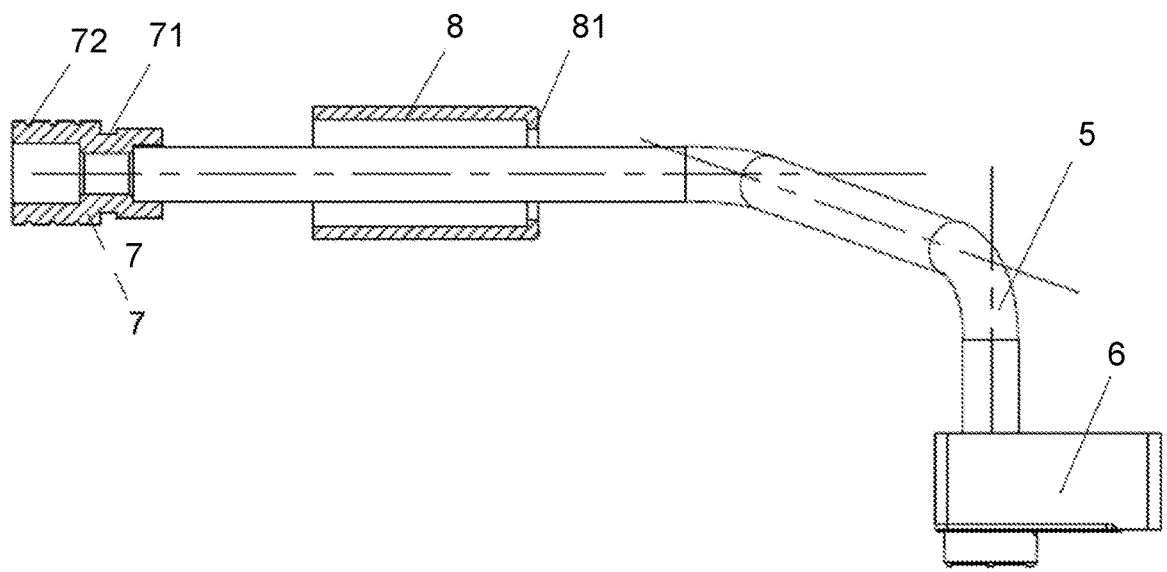
FIG. 7 is a schematic structure diagram in which the rigid pipe is connected with a transition joint and a retaining ring in embodiment 1.
Figure 8:
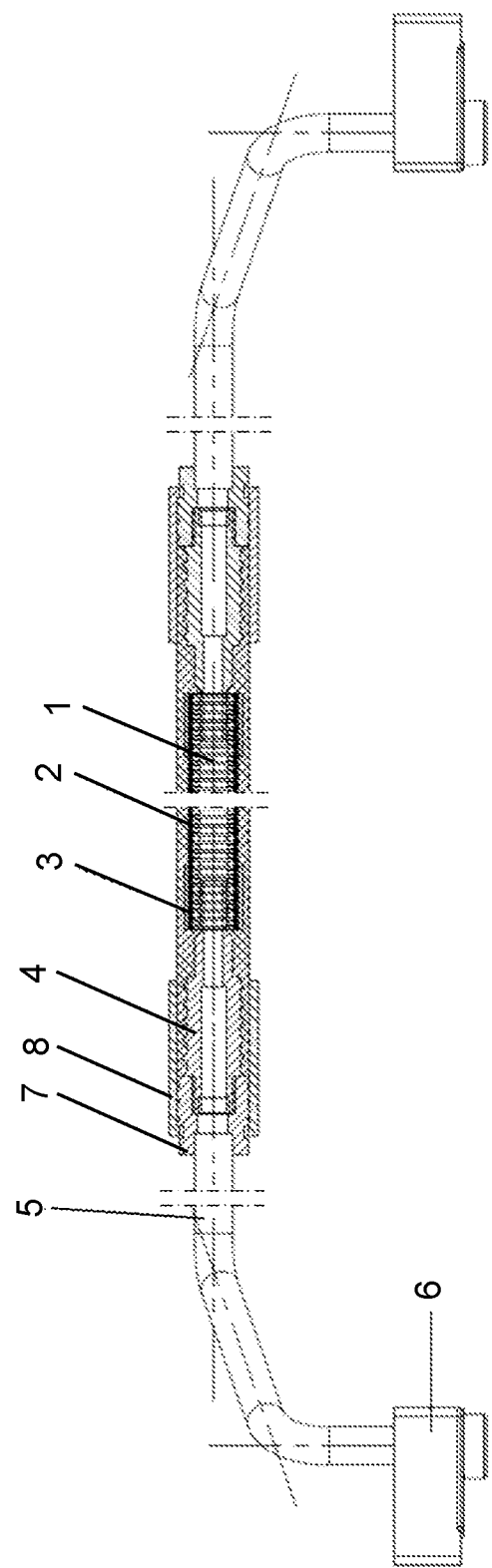
FIG. 8 is a schematic structure diagram before buckling the retaining ring when a hose is connected with the rigid pipe in embodiment 1.
Figure 9:
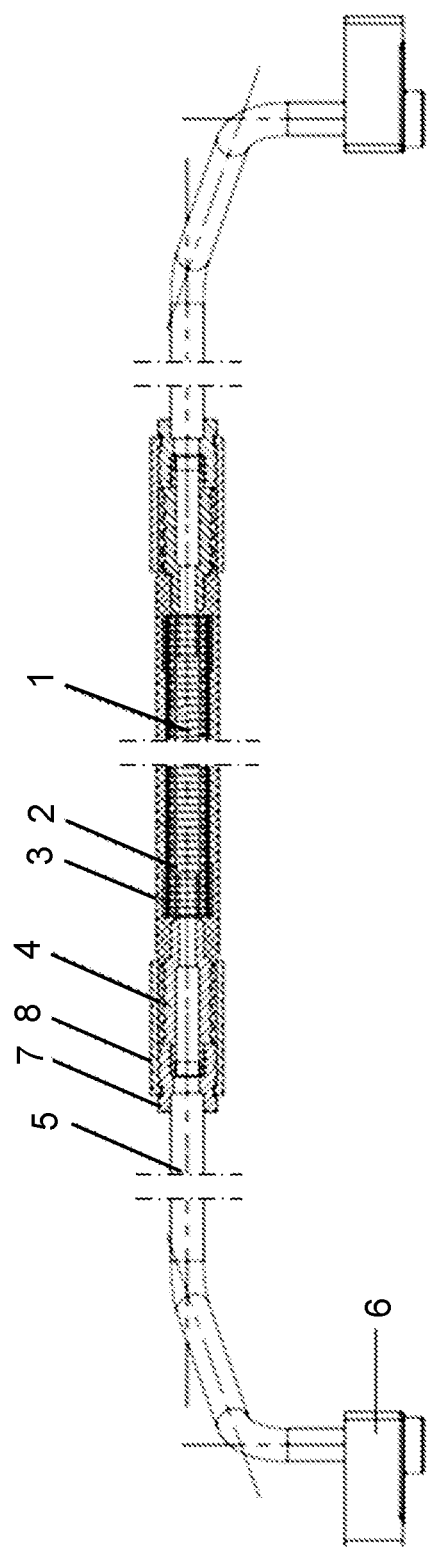
FIG. 9 is a schematic structure diagram of a hose and rigid pipe connecting system used in a high pressure system obtained in embodiment 1.

The used rigid pipe 5 can be made of aluminum, stainless steel or other metals, one end of the rigid pipe 5 can be connected with a platen 6 by flame brazing, high frequency induction welding, cold welding, gas shielded brazing and laser welding as shown in FIG. 6, the other end of the rigid pipe 5 is connected with the transition joint 7 by flame brazing, high-frequency induction welding, cold welding, gas shielded brazing or laser welding, and the rigid pipe 5 and the transition joint 7 connected on the rigid pipe 5 need to be connected with the hose by the retaining ring 8. The specific connecting mode is shown in FIG. 7-9. The transition joint 7 adopted in this embodiment is provided with an inwardly concaved annular groove 71 and an annular recess 72, and the inner side surface is a threaded surface which is connected with the convex teeth 41 at the outer end of the core pipe 4. After the above-mentioned sleeving connection is completed, the retaining ring 8 is sleeved between the hose and the rigid pipe. Specifically, one end of the retaining ring 8 connected with the rigid pipe 5 is provided with an inwardly convexed part 81 which extends into the annular groove 71 provided on the transition joint 7, as shown in FIG. 8, and the annular recess 72 is provided on the outer side surface of the transition joint 7. The used retaining ring 8 is made of aluminum, which is relatively soft. Before buckling processing, the inner surface of the retaining ring 8 is of a flat structure. During buckling processing, the inner surface of the retaining ring 8 is partially deformed with the outer surface of the transition joint 7 under the external force of the buckling machine, and is pressed into the annular recess 72 of the transition joint 7, so that tight connection can be realized without additional process steps, and the processing difficulty and cost are reduced.

The retaining ring 8 is integrally compressed by the buckling claw of the buckling machine, and then the transition joint 7 is squeezed, so that the riveting connection between the transition joint 7 and the core pipe 4 and the retaining ring 8 is realized, the sealing and pull-off resistance effects are achieved, and finally the hose and rigid pipe connecting system used in the high pressure system is obtained, as shown in FIG. 9.

According to a sealing performance test of the hose and rigid pipe connecting and sealing system for a high-pressure air-conditioning pipeline manufactured in the embodiment, when the bursting pressure reaches 800 bar, the hose and rigid pipe connecting and sealing system can still be used without leakage, while the bursting pressure of the existing common air-conditioning hose is only about 100 bar, thus the pressure of the application is improved by an order of magnitude compared with the prior art. According to the technical requirements of the existing R744 air conditioning pipeline, the standard of its burst pressure is 340 bar, while the measured value of the burst pressure of the invention is already more than 800 bar. In this way, the invention can be used in an air conditioning pipeline of a new energy vehicle. Since it can bear high pressure, the invention can utilize a heat pump technology for heating, and the problem that the cruising range of an electric vehicle is greatly reduced due to power consumption when heating in the traditional electric heating mode is solved.

In addition, in the embodiment, by winding the metal wires around the corrugated pipe to form the reinforcing layer, and then connecting with the core pipe, the axial tensile strength and sealing reliability can be improved, and the tensile strength reaches 10,880 N. Under the conditions of the temperature being −40° C. to 165° C. and the pulse pressure being 50 bar to 175 bar, the effect that the high and low temperature cyclic pulse test passes over 150,000 times without leakage is achieved. According to the technical requirements of the R744 air conditioning pipeline, its tensile strength is at least 2000 N, and it is required that the high and low temperature cyclic pulse test passes over 150,000 times without leakage.

Embodiment 2

Figure 10:
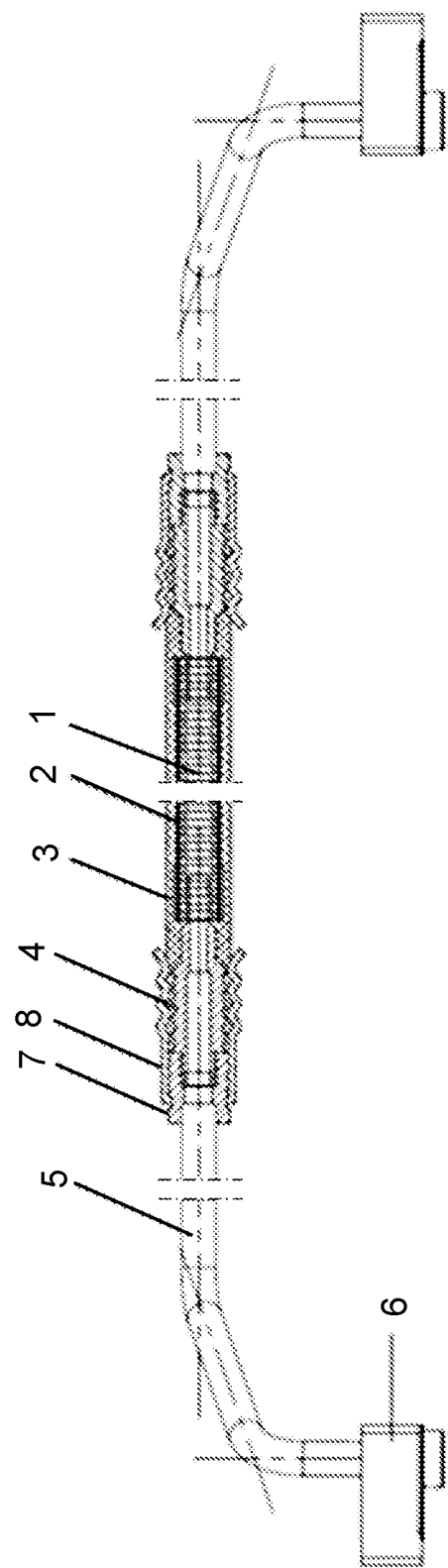
FIG. 10 is a schematic structure diagram of a hose and rigid pipe connecting system used in a high pressure system obtained in embodiment 2.

A hose and rigid pipe connecting system used in a high pressure system has substantially the same structure as embodiment 1, but differs from it in that in this embodiment, the buckling machine carries out targeted local squeezing along the outer wall of the retaining ring 8 to form the structure of the hose and rigid pipe connecting system as shown in FIG. 10, and the connecting part of the retaining ring 8 and the hose forms a wavy structure, so that the connection tightness between the retaining ring 8 and the rubber coating layer 10 is further deepened, and the hose and rigid pipe connecting system is more suitable for the environment of alternating temperatures.

Embodiment 3

A hose and rigid pipe connecting system used in a high pressure system has substantially the same structure as embodiment 1, but differs from it in that the retaining ring 8 used in embodiment 1 is made of aluminum; and since metal aluminum is relatively soft and prone to deformation under stress, the retaining ring 8 deforms after being squeezed by the buckling machine and then is embedded into the annular recess 72 on the outer surface of the transition joint 7 to realize sealing. However, the retaining ring 8 used in this embodiment is made of relatively hard metal materials, for example, stainless steel or other metals. For convenience of presentation, the embodiment takes the retaining ring made of stainless steel as an example.

Figure 11:
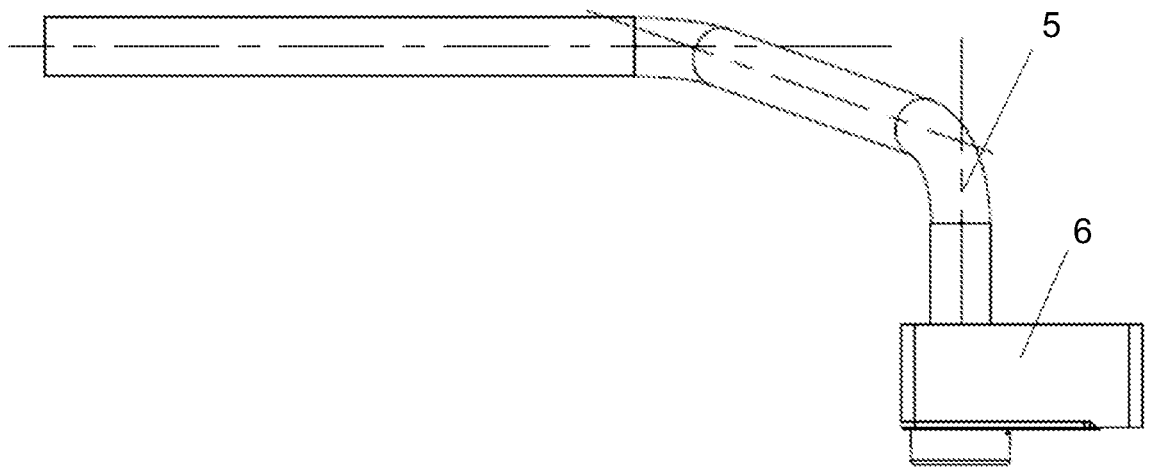
FIG. 11 is a schematic structure diagram in which a rigid pipe is connected with a platen in embodiment 3.
Figure 12:
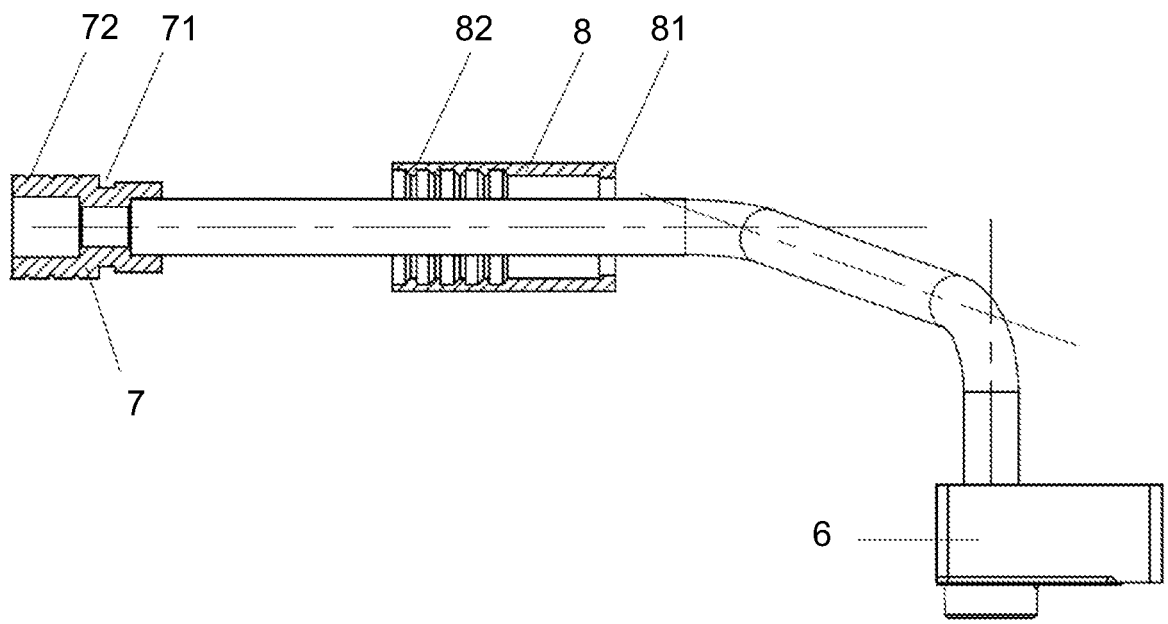
FIG. 12 is a schematic structure diagram in which the rigid pipe is connected with a transition joint and a retaining ring in embodiment 3.
Figure 13:
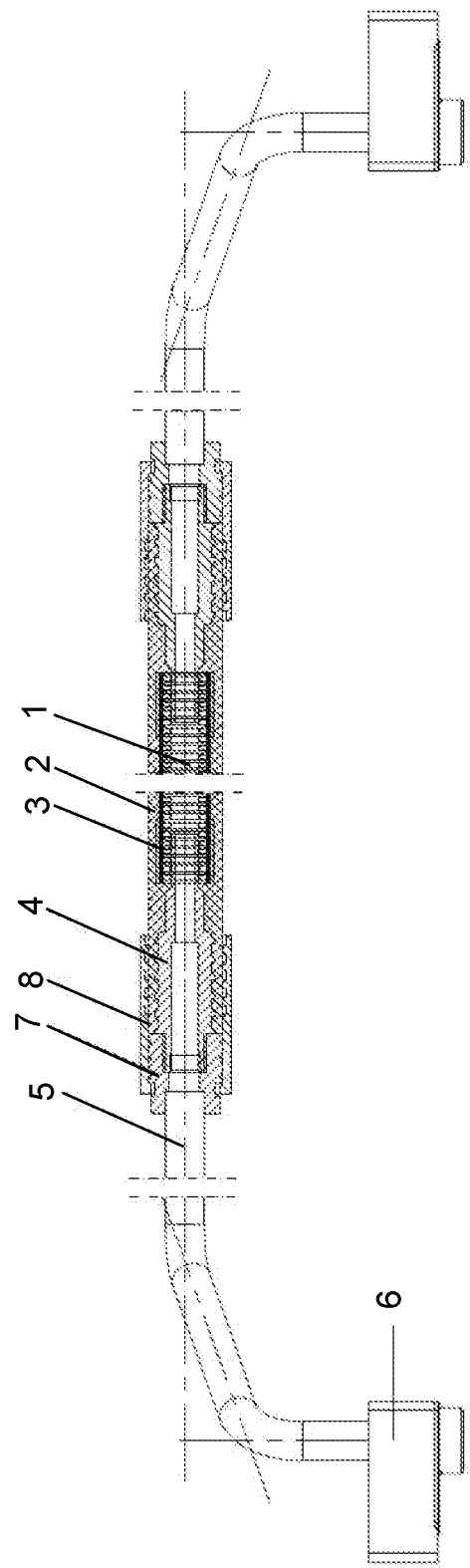
FIG. 13 is a schematic structure diagram before buckling the retaining ring when connecting a hose and the rigid pipe in embodiment 3.
Figure 14:
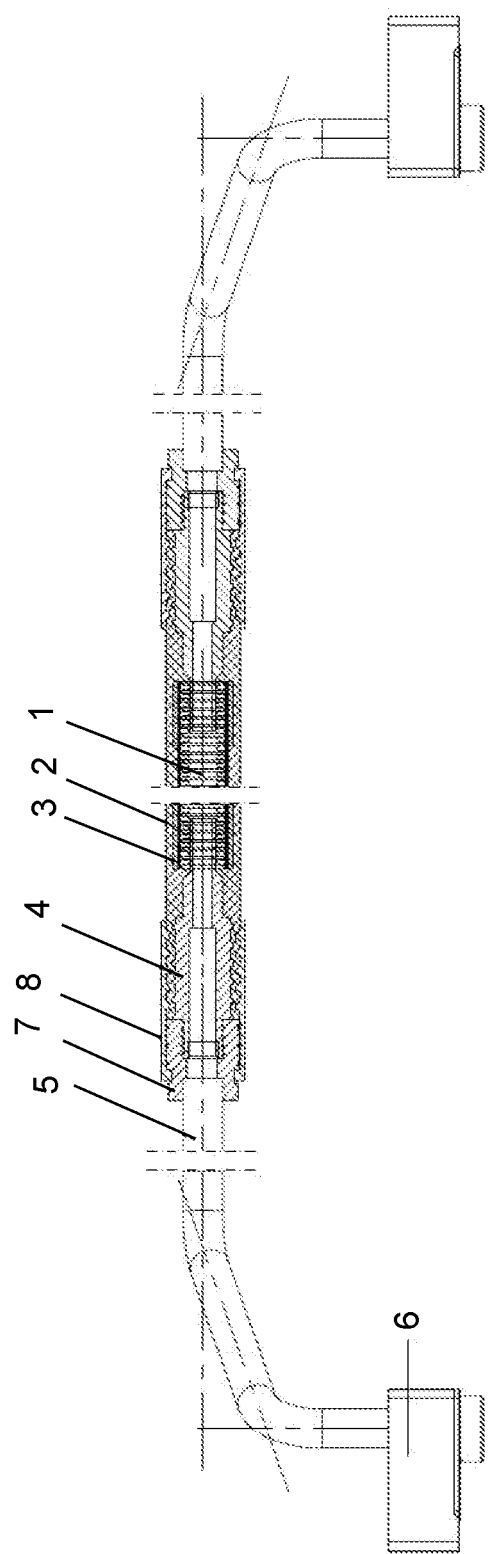
FIG. 14 is a schematic structure diagram of a hose and rigid pipe connecting system used in a high pressure system obtained in embodiment 3.

The used rigid pipe 5 can be made of aluminum, stainless steel or other metals, one end of the rigid pipe 5 can be connected with a platen 6 by flame brazing, high frequency induction welding, cold welding, gas shielded brazing and laser welding as shown in FIG. 11, the other end of the rigid pipe 5 is connected with the transition joint 7 by flame brazing, high-frequency induction welding, cold welding, gas shielded brazing or laser welding, and the rigid pipe 5 and the transition joint 7 connected on the rigid pipe 5 need to be connected with the hose by the retaining ring 8. The specific connecting mode is shown in FIGS. 12-14.

An annular inwardly convexed structure 82 is provided at the inner surface of the retaining ring 8 used in this embodiment, and the annular inwardly convexed structure 82 is matched with the annular protrusion 42 of the core pipe 4. During processing, the inwardly convexed part 81 of the retaining ring 8 also extends into the annular groove 71 provided on the transition joint 7, as shown in FIG. 14. After buckling treatment, the annular inwardly convexed structure 82 on the inner surface of the retaining ring 8 is matched with the annular protrusion 42 on the outer surface of the core pipe 4 to clamp the rubber coating layer 10, and the obtained structure of the hose and rigid pipe connecting system is shown in FIG. 14. Since stainless steel is relatively hard, this solution has higher tensile strength.

Embodiment 4

Figure 15:
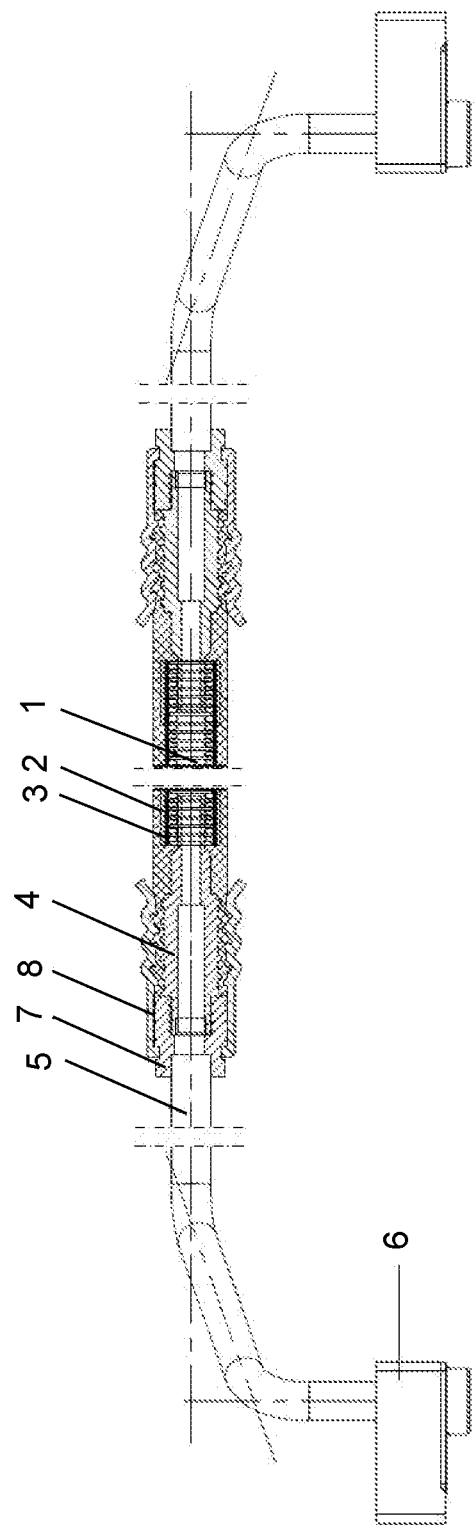
FIG. 15 is a schematic structure diagram of a hose and rigid pipe connecting system used in a high pressure system obtained in embodiment 4.

A hose and rigid pipe connecting system used in a high pressure system has substantially the same structure as embodiment 3, but differs from it in that in this embodiment, the buckling machine carries out targeted local squeezing along the outer wall of the retaining ring 8 to form the structure of the hose and rigid pipe connecting system as shown in FIG. 15, and the connecting part of the retaining ring 8 and the hose forms a wavy structure, so that the connection tightness between the retaining ring 8 and the rubber coating layer 10 is further deepened, and the hose and rigid pipe connecting system is more suitable for the environment of alternating temperatures.

Embodiment 5

Figure 16:
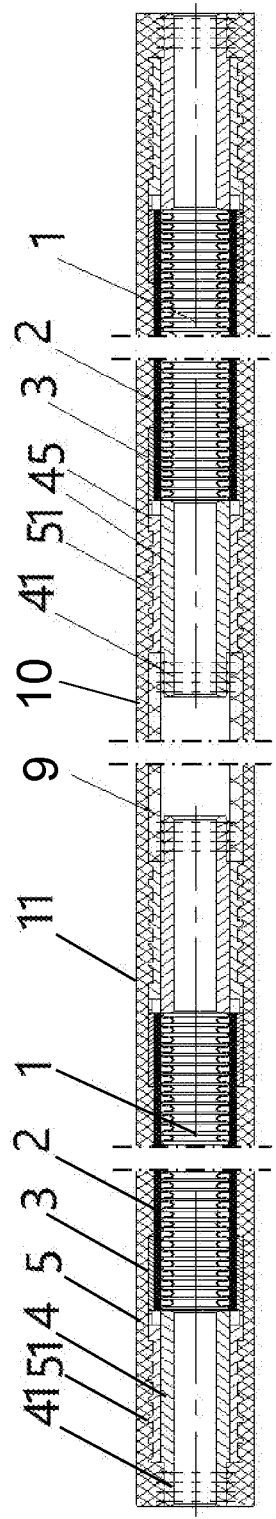
FIG. 16 is a schematic structure diagram of a hose in embodiment 5.

A hose and rigid pipe connecting system used in a high pressure system has substantially the same structure as embodiment 1, but differs from it in that in this embodiment, to meet the requirement of continuous production during rubber coating, a long enough metal hose needs to be used, metal hoses are connected by a traction pipe 9 by interference fit connection or threaded connection, etc., for example, in this embodiment, both ends of the traction pipe 9 are respectively connected with the convex teeth 41 of the core pipe 4 to connect the metal hoses into a whole, and then rubber coating is performed on the outer side, so as to obtain the structure as shown in FIG. 16. Through the above treatment, the length of the metal hoses can be increased to meet the requirements of a rubber coating process.

Embodiment 6

Figure 17:
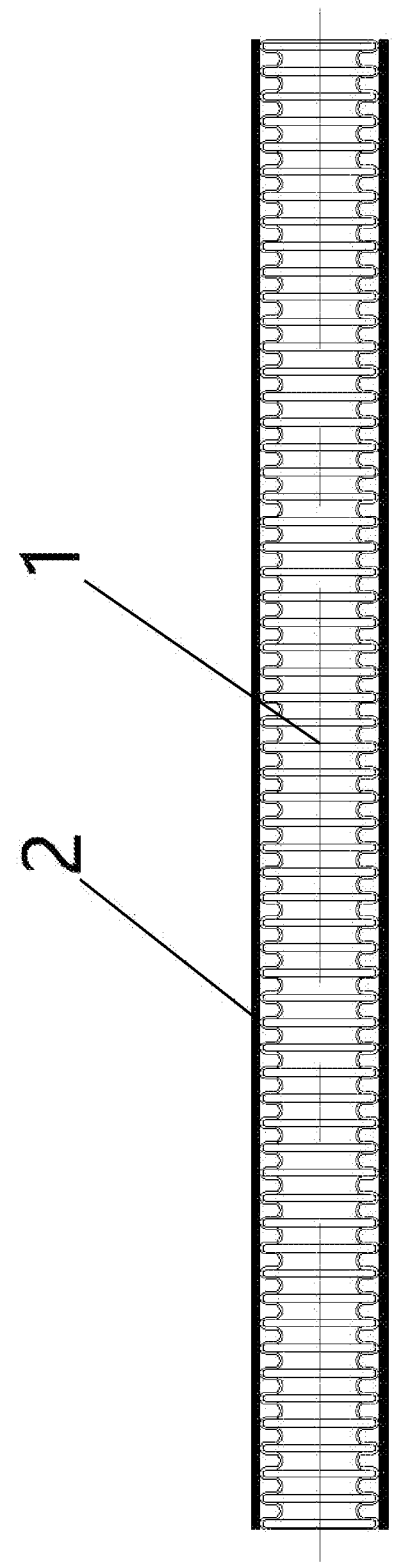
FIG. 17 is a schematic structure diagram of a corrugated pipe wound by metal wires in embodiment 6.

A hose and rigid pipe connecting system used in a high pressure system, which mainly comprises a hose, a rigid pipe 5, a transition joint 7, a retaining ring 8, etc. The used hose is made up of connecting a core pipe 4 and a corrugated pipe 1, and other components. The structure of the used corrugated pipe 1 is shown in FIG. 17. In this embodiment, a metal corrugated pipe is used, and the outer side of the corrugated pipe 1 is wound and woven by metal wires 2, and the wound metal wires coat the outer surface of the corrugated pipe 1 to form a reinforcing layer. In this way, by directly winding and weaving the metal wires around the outer side of the corrugated pipe and then connecting with the core pipe 4, the axial tensile strength and sealing reliability can be improved.

Figure 18:
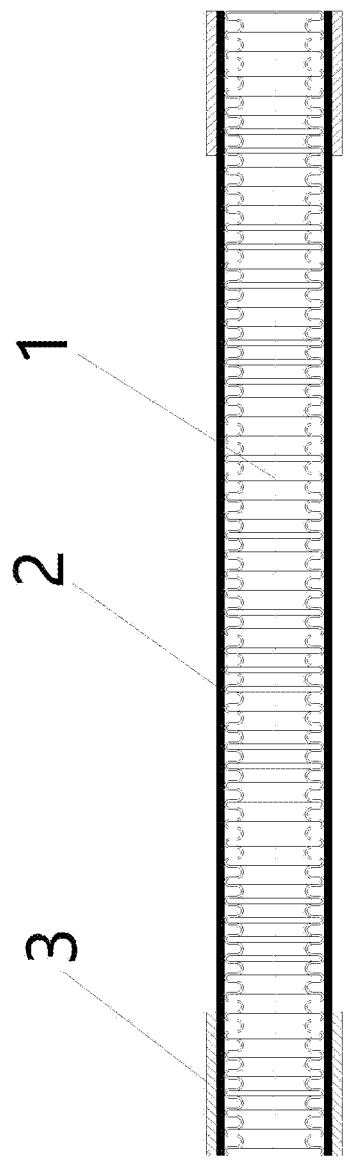
FIG. 18 is a schematic structure diagram of the corrugated pipe equipped with sheaths in embodiment 6.
Figure 19:
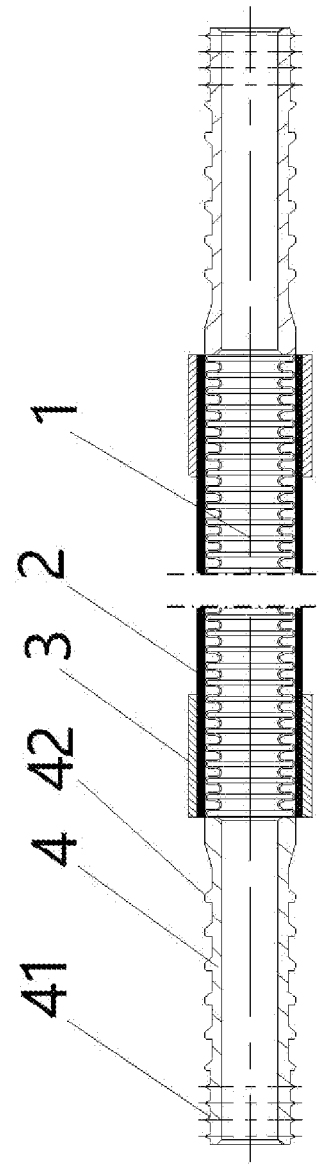
FIG. 19 is a schematic structure diagram after welding core pipes in embodiment 6.

The outer sides of the metal wires 2 at both ends of the corrugated pipe 1 are sleeved with sheaths 3, as shown in FIG. 18, and the metal wires 2 are further tightened and positioned by the sheaths 3, so that a fastened connection is formed between the metal wires 2 and the corrugated pipe 1. Then, the core pipe 4 is connected with both ends of the corrugated pipe 1, as shown in FIG. 19. The connecting mode can be welding, riveting or rolling interference, and the welding can also be laser welding, argon arc welding, gas shielded brazing, high frequency induction welding or plasma welding as long as it can ensure close contact between them. The connecting mode adopted in this embodiment is argon arc welding. An annular protrusion 42 is provided on the outer surface of the adopted core pipe 4, convex teeth 41 are provided at the outer ends, and the outer diameter of the core pipe 4 is smaller than those of the sheaths 3 connected with the outer sides of the metal wires 2.

Figure 20:
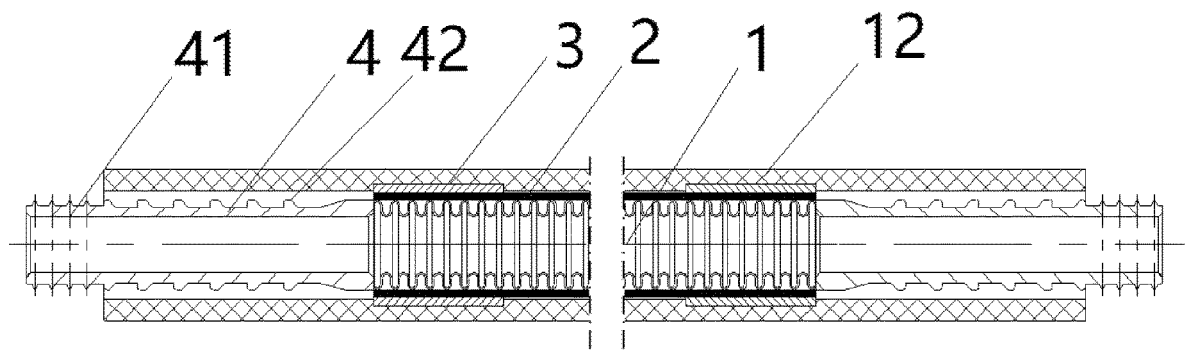
FIG. 20 is a schematic structure diagram after a rubber pipe is sleeved in embodiment 6.

After the core pipe 4 is connected, the corrugated pipe 1, the sheaths 3 and the core pipe 4 are inserted into the rubber pipe 11 in a pre-processed length, and the convex teeth 41 at the ends of the core pipe 4 also extend out of the rubber pipe 11, as shown in FIG. 20. With the adoption of this processing method, a processing technology is greatly simplified and the manufacturing production is more facilitated without affecting the sealing performance and axial tension.

Figure 21:
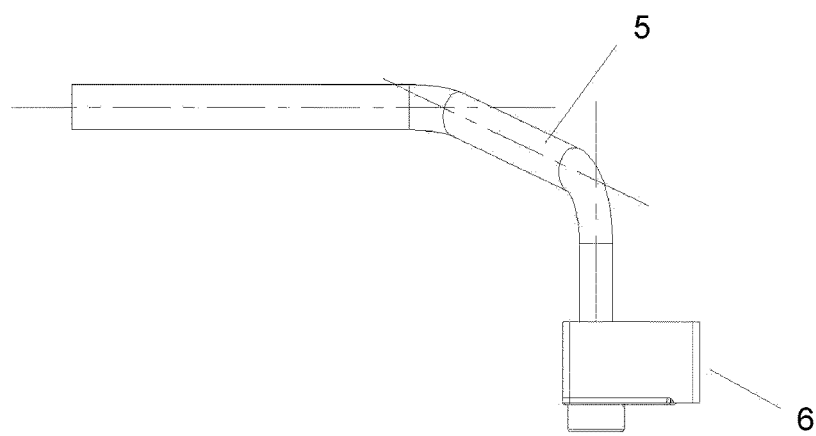
FIG. 21 is a schematic diagram of a connecting structure of a rigid pipe and a platen in embodiment 6.
Figure 22:
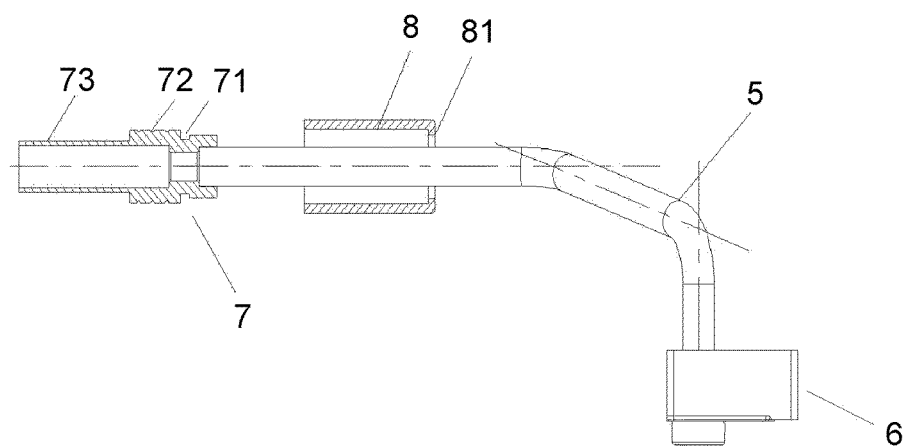
FIG. 22 is a schematic structure diagram in which the rigid pipe is connected with a transition joint and a retaining ring in embodiment 6.
Figure 23:
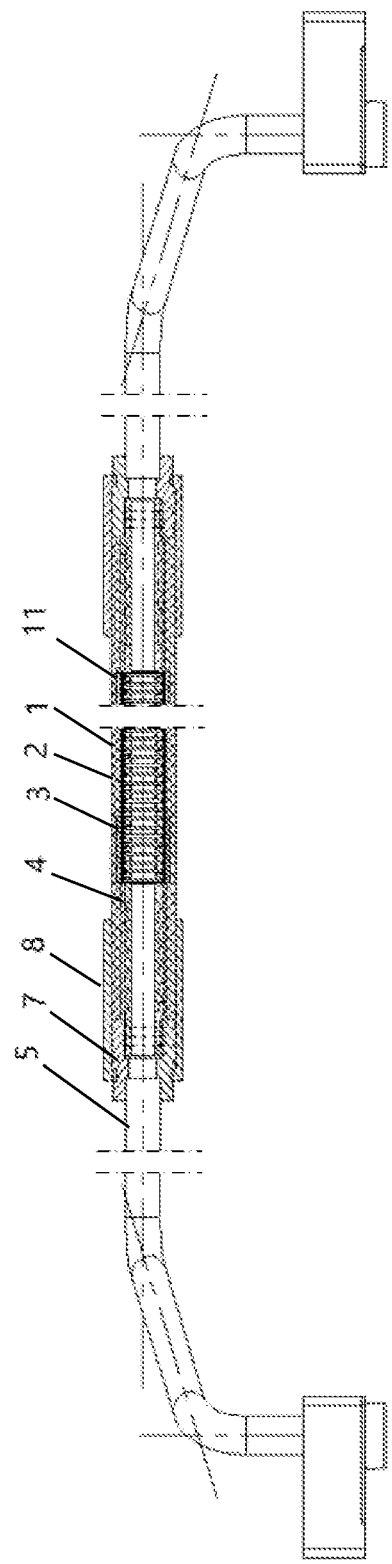
FIG. 23 is a schematic structure diagram before buckling the retaining ring when connecting a hose and the rigid pipe in embodiment 6.
Figure 24:
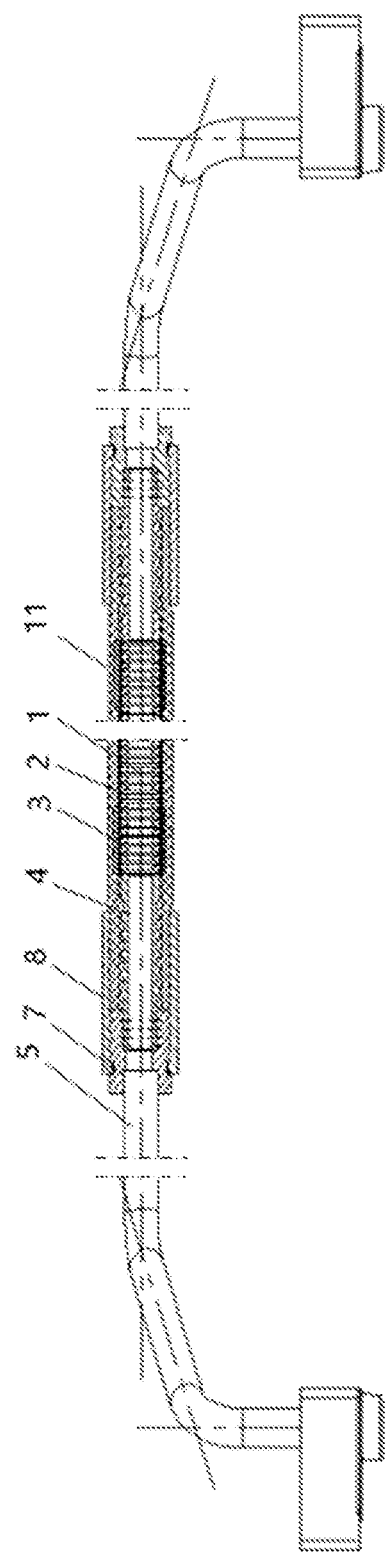
FIG. 24 is a schematic structure diagram of a hose and rigid pipe connecting system used in a high pressure system obtained in embodiment 6.

The used rigid pipe 5 can be made of aluminum, stainless steel or other metals, one end of the rigid pipe 5 can be connected with a platen 6 by flame brazing, high frequency induction welding, cold welding, gas shielded brazing and laser welding as shown in FIG. 21, the other end of the rigid pipe 5 is connected with the transition joint 7 by flame brazing, high-frequency induction welding, cold welding, gas shielded brazing or laser welding, and the rigid pipe 5 and the transition joint 7 connected on the rigid pipe 5 need to be connected with the hose by the retaining ring 8. The specific connecting mode is shown in FIGS. 22-24. In addition to the inwardly concaved annular groove 71 and the annular recess 72 the same as in the foregoing embodiments, the transition joint 7 adopted in the embodiment is provided with a protruding part 73 extending toward the hose. In use, the protruding part 73 extends between the core pipe 4 and the rubber pipe 11 to fill a gap between the rubber pipe 11 and the core pipe 4, and then the sealing connection between the rubber pipe 11 and the core pipe 4 is completed by further processing. The annular protrusion 42 on the outer side surface of the core pipe 4 can achieve further fastening.

In this embodiment, the material of the used retaining ring 8 is aluminum, which is relatively soft, and an inner surface of the retaining ring 8 is of a flat structure before buckling processing, as shown in FIG. 23. During buckling processing, the inner surface of the retaining ring 8 is partially deformed with the outer surface of the transition joint 7 under the external force of the buckling machine, and is pressed into the annular recess 72 of the transition joint 7, so that tight connection can be realized without additional process steps, and the processing difficulty and cost are reduced.

The retaining ring 8 is integrally compressed by the buckling claw of the buckling machine, and then the transition joint 7 is squeezed, so that the riveting connection between the transition joint 7 and the core pipe 4, the retaining ring 8 and the rubber pipe 11 is realized, the sealing and pull-off resistance effects are achieved, and finally the hose and rigid pipe connecting system used in the high pressure system is obtained, as shown in FIG. 24.

According to a sealing performance test of the hose and rigid pipe connecting and sealing system for a high-pressure air-conditioning pipeline manufactured in the embodiment, when the bursting pressure reaches 800 bar, the hose and rigid pipe connecting and sealing system can still be used without leakage, while the bursting pressure of the existing common air-conditioning hose is only about 100 bar, thus the pressure of the application is improved by an order of magnitude compared with the prior art. According to the technical requirements of the existing R744 air conditioning pipeline, the standard of its burst pressure is 340 bar, while the measured value of the burst pressure of the invention is already more than 800 bar. In this way, the invention can be used in an air conditioning pipeline of a new energy vehicle. Since it can bear high pressure, the invention can utilize a heat pump technology for heating, and the problem that the cruising range of an electric vehicle is greatly reduced due to power consumption when heating in the traditional electric heating mode is solved.

In addition, in the embodiment, the corrugated pipe is wound by the metal wires to form the reinforcing layer, which is then connected with the core pipes, so that the axial tensile strength and sealing reliability can be improved. The tensile strength reaches 4360 N, and under the conditions of the temperature being −40° C. to 165° C. and the pulse pressure being 5 MPa to 17.5 MPa, the effect that the high and low temperature cyclic pulse test passes over 150,000 times without leakage is achieved. According to the technical requirements of the R744 air conditioning pipeline, its tensile strength is at least 2000 N, and it is required that the high and low temperature cyclic pulse test passes over 150,000 times without leakage.

Embodiment 7

Figure 25:
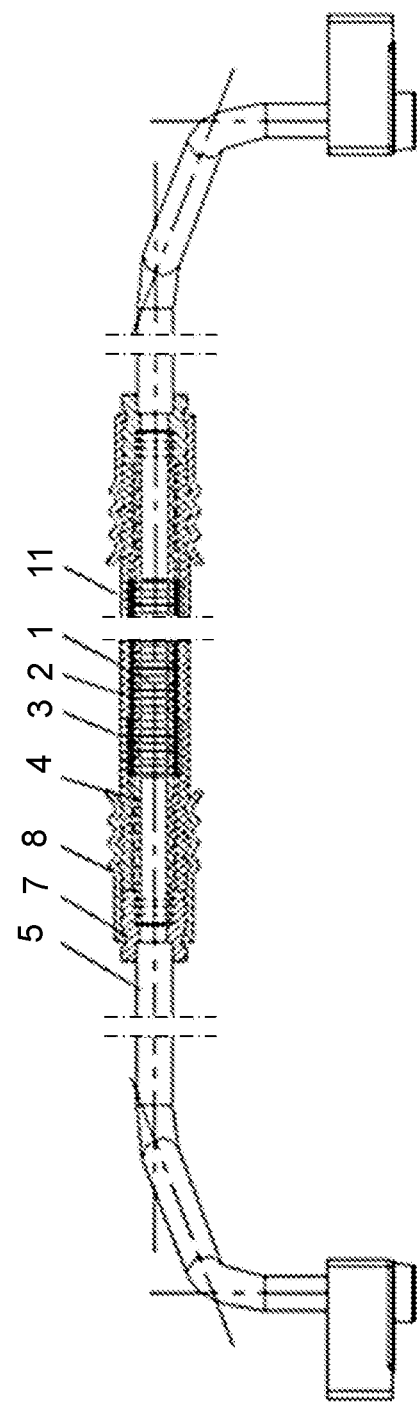
FIG. 25 is a schematic structure diagram of a hose and rigid pipe connecting system used in a high pressure system obtained in embodiment 7.

A hose and rigid pipe connecting system used in a high pressure system has substantially the same structure as embodiment 6, but differs from it in that in this embodiment, the buckling machine carries out targeted local squeezing along the outer wall of the retaining ring 8 to form the structure of the hose and rigid pipe connecting system as shown in FIG. 25, and the connecting part of the retaining ring 8 and the hose forms a wavy structure, so that the connection tightness between the retaining ring 8 and the rubber pipe 11 is further deepened, and the hose and rigid pipe connecting system is more suitable for the environment of alternating temperatures.

Embodiment 8

A hose and rigid pipe connecting system used in a high pressure system has substantially the same structure as embodiment 6, but differs from it in that the retaining ring 8 used in embodiment 6 are made of aluminum; and since metal aluminum is relatively soft and prone to deformation under stress, the retaining ring 8 deforms after being squeezed by the buckling machine and then is embedded into the annular recess 72 on the outer surface of the transition joint 7 to realize sealing. However, the retaining ring 8 used in this embodiment is made of relatively hard metal materials, for example, stainless steel or other metals. For convenience of presentation, this embodiment takes a retaining ring made of carbon steel as an example.

Figure 26:
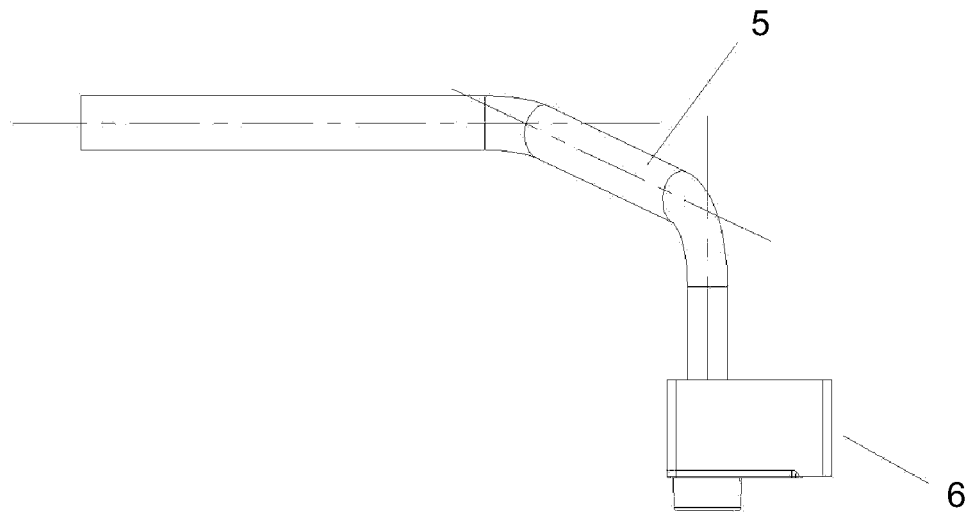
FIG. 26 is a schematic diagram of a connecting structure of a rigid pipe and a platen in embodiment 8.
Figure 27:
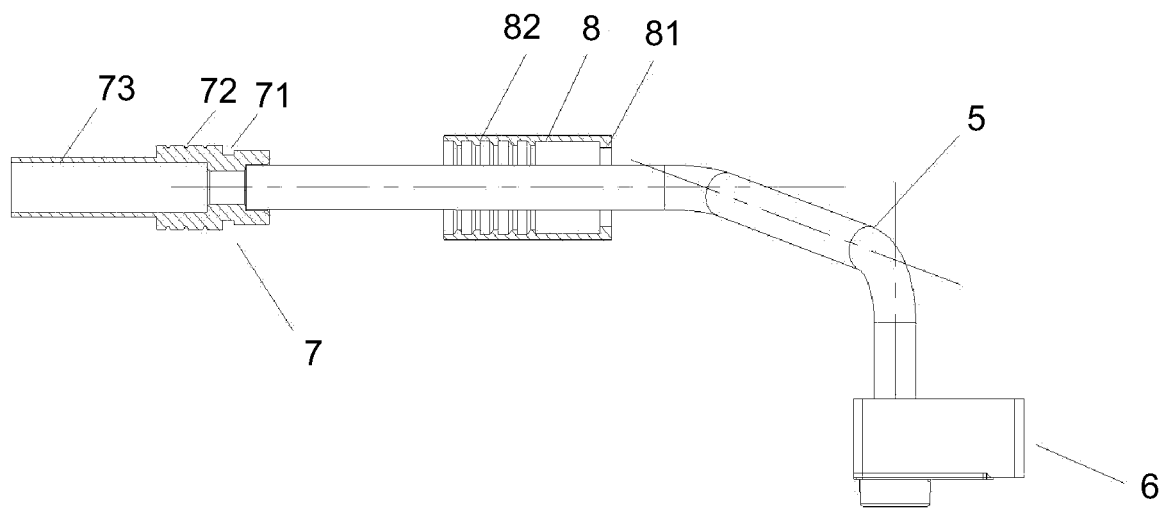
FIG. 27 is a schematic structure diagram in which the rigid pipe is connected with a transition joint and a retaining ring in embodiment 8.
Figure 28:
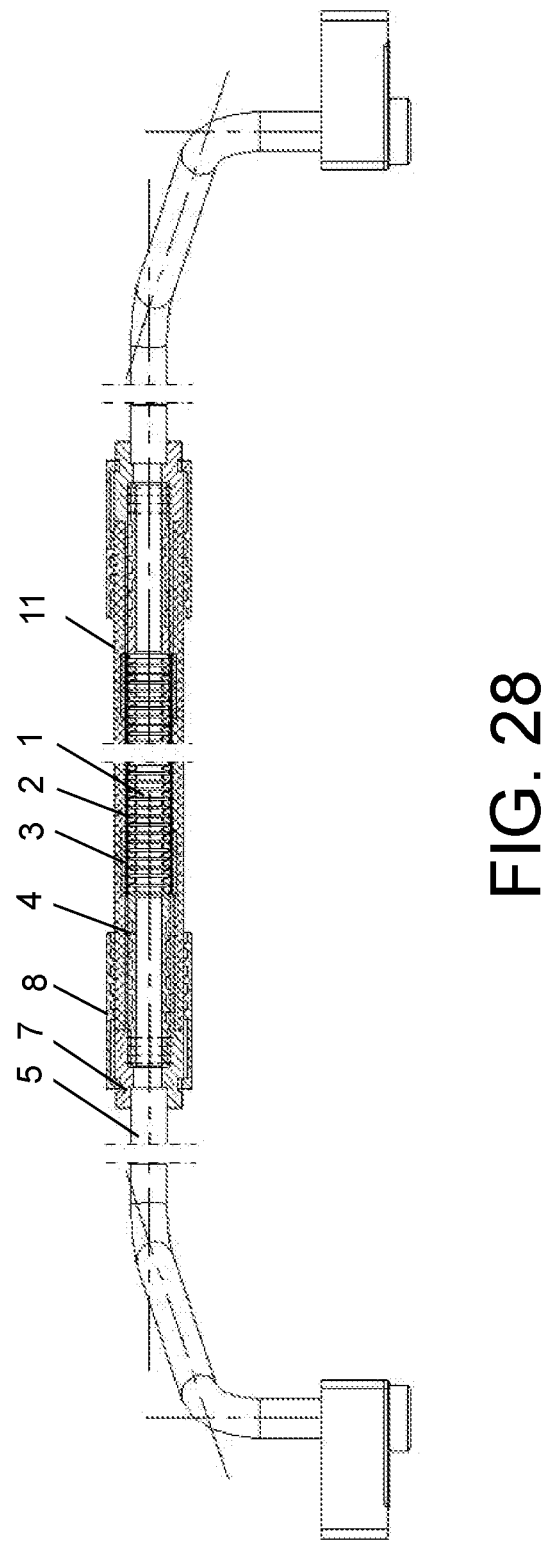
FIG. 28 is a schematic structure diagram before buckling the retaining ring when connecting a hose and the rigid pipe in embodiment 8.

The used rigid pipe 5 can be made of carbon steel, one end of the rigid pipe 5 can be connected with a platen 6 by high frequency induction welding as shown in FIG. 26, the other end of the rigid pipe 5 is connected with the transition joint 7 by cold welding, and the rigid pipe 5 and the transition joint 7 connected on the rigid pipe 5 need to be connected with the hose by utilizing the retaining ring 8. The specific connecting mode is shown in FIGS. 27-28.

Figure 29:
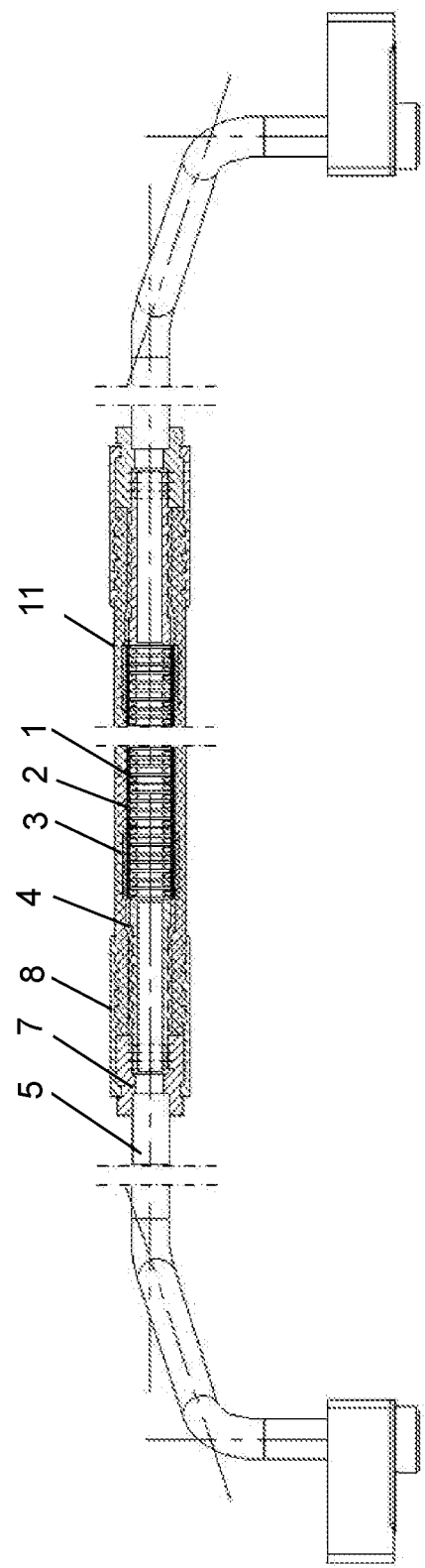
FIG. 29 is a schematic structure diagram of a hose and rigid pipe connecting system used in a high pressure system obtained in embodiment 8.

An annular inwardly convexed structure 82 is provided at the inner surface of the retaining ring 8 used in this embodiment, and the annular inwardly convexed structure 82 is matched with the annular protrusion 42 on the outer surface of the core pipe 4. During processing, the inwardly convexed part 81 of the retaining ring 8 also extends into the annular groove 71 provided on the transition joint 7, as shown in FIG. 28. Through buckling treatment, the annular inwardly convexed structure 82 on the inner surface of the retaining ring 8 is matched with the annular protrusion 42 on the outer surface of the core pipe 4 to clamp the rubber pipe 11 and the protruding part 73 of the transition joint, and the obtained structure of the hose and rigid pipe connecting system is as shown in FIG. 29. Since carbon steel is relatively hard, this solution has higher tensile strength.

Embodiment 9

Figure 30:
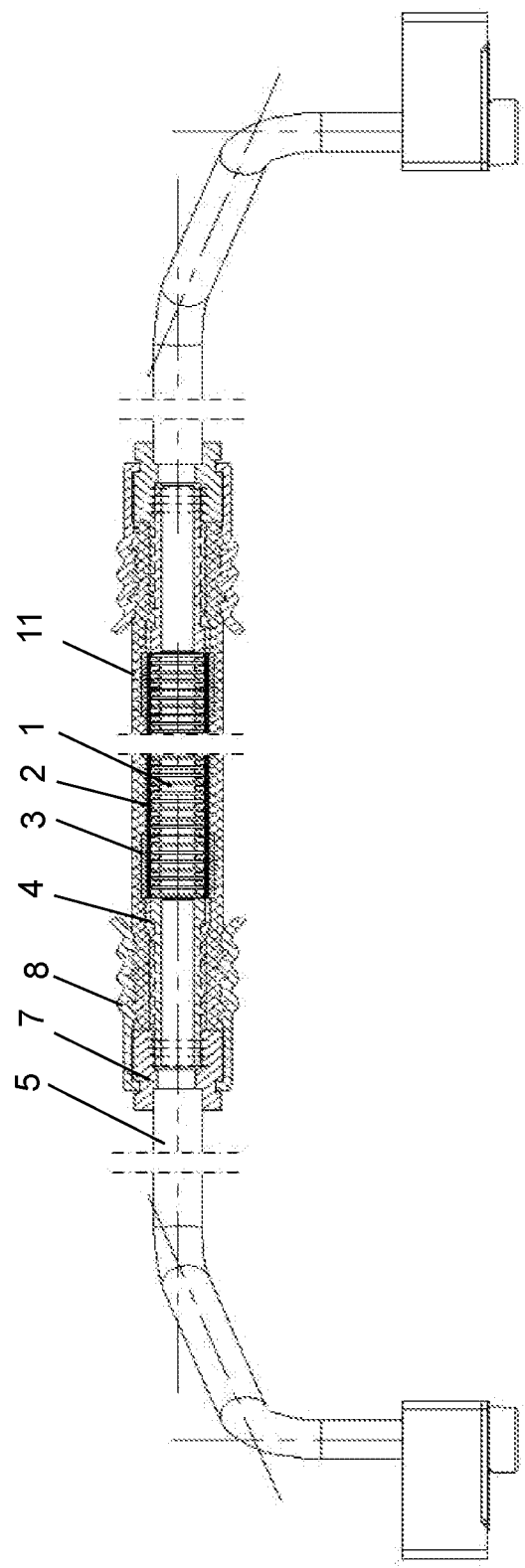
FIG. 30 is a schematic structure diagram of a hose and rigid pipe connecting system used in a high pressure system obtained in embodiment 9.

A hose and rigid pipe connecting system used in a high pressure system has substantially the same structure as embodiment 8, but differs from it in that in this embodiment, the buckling machine carries out targeted local squeezing along the outer wall of the retaining ring 8 to form the structure of the hose and rigid pipe connecting system as shown in FIG. 30, and the connecting part of the retaining ring 8 and the hose forms a wavy structure, so that the connection tightness between the retaining ring 8 and the rubber pipe 11 is further deepened, and the hose and rigid pipe connecting system is more suitable for the environment of alternating temperatures.

In the description of the present invention, it is to be understood that the terms "ends," "outer surfaces," "outer sides," and the like are used for the purpose of indicating an orientation or positional relationship, merely for convenience in describing the present invention and for simplicity of description, and are not intended to indicate or imply that the referenced components or elements must have a particular orientation, be constructed and operated in a particular orientation, and are not to be construed as limiting the present invention.

The embodiments described above are intended to facilitate a person of ordinary skill in the art in understanding and using the invention. It will be readily apparent to those skilled in the art that various modifications to these embodiments may be made, and the generic principles described herein may be applied to other embodiments without the use of the inventive faculty. Therefore, the present invention is not limited to the above embodiments, and improvements and modifications made by those skilled in the art according to the disclosure of the present invention without departing from the scope of the present invention should be within the scope of protection of the present invention.

What is claimed is:

1. A hose and rigid pipe connecting system for a high pressure system, comprising:
   a hose made up of connecting a core pipe and a corrugated pipe, an outer side of the corrugated pipe being wound and woven by metal wires; a rigid pipe; a transition joint connecting the hose and the rigid pipe; and a retaining ring buckled on outer sides of the hose and the transition joint,
   wherein the metal wires at both ends of the corrugated pipe are sleeved with a sheath, and are tightened and positioned by the sheath,
   wherein the corrugated pipe, the metal wires and the sheaths are integrally connected with the core pipe by welding or rolling interference,
   wherein the core pipe, the corrugated pipe, the metal wires and the sheaths are inserted into a rubber pipe,
   wherein the transition joint is provided with an inwardly concaved annular groove and an annular recess,
   wherein the material of the retaining ring is aluminum or stainless steel, one end of the retaining ring is inwardly convexed, and the inwardly convexed end is embedded into the inwardly concaved annular groove of the transition joint when being buckled,
   the inner surface of the retaining ring is of a flat structure prior to buckling,
   wherein the retaining ring is pressed into the annular recess of the transition joint after being buckled.

2. The hose and rigid pipe connecting system for the high pressure system of claim 1, wherein the rubber pipe is cut into a specified length.

3. The hose and rigid pipe connecting system for the high pressure system of claim 2, wherein an annular protrusion is provided on an outer surface of the core pipe, and convex teeth are provided at an outer end of the core pipe and extend out of the rubber pipe.

4. The hose and rigid pipe connecting system for the high pressure system of claim 1, wherein the welding includes laser welding, argon arc welding, brazing, high frequency induction welding or plasma welding.

5. The hose and rigid pipe connecting system for the high pressure system of claim 3, wherein the core pipe is connected with the transition joint through the convex teeth at the outer end.

6. The hose and rigid pipe connecting system for the high pressure system of claim 1, wherein the material of the rigid pipe is aluminum or stainless steel.

7. The hose and rigid pipe connecting system for the high pressure system of claim 1, wherein the rigid pipe is connected with the transition joint by flame brazing, high frequency induction welding, cold welding, gas shielded brazing or laser welding.

8. The hose and rigid pipe connecting system for the high pressure system of claim 1, wherein the rigid pipe is connected with a platen by flame brazing, high frequency induction welding, cold welding, gas shielded brazing or laser welding at the other side opposite to the side where the transition joint is connected.

9. The hose and rigid pipe connecting system for the high pressure system of claim 1, wherein the retaining ring is made of stainless steel, and an annular inwardly convexed structure is provided at the inner surface of the retaining ring.

10. The hose and rigid pipe connecting system for the high pressure system of claim 9, wherein, after the retaining ring made of stainless steel is buckled, the annular inwardly convexed structure on the inner surface of the retaining ring is matched with the annular protrusion of the core pipe to clamp the rubber pipe.

11. The hose and rigid pipe connecting system for the high pressure system of claim 1, wherein a buckling claw of a buckling machine compresses the retaining ring to squeeze the transition joint, so as to realize connection between the transition joint and the core pipe and the retaining ring, and to achieve sealing and pull-off resistance effects.

* * * * *